United States Patent [19]

Parenti et al.

[11] 4,348,057
[45] Sep. 7, 1982

[54] BLOWER AND DUST COLLECTING MACHINE AND METHOD OF OPERATION

[75] Inventors: Joseph A. Parenti, 1204 Buckhannon Ave., Morgantown, W. Va. 26505; Malcolm J. Charles, Lodi, Calif.

[73] Assignee: B & J Manufacturing Company, Glenwood, Ill. ; by said Malcolm Jean Charles

[21] Appl. No.: 181,101

[22] Filed: Aug. 25, 1980

[51] Int. Cl.³ .......................... E21C 7/02; B01D 45/12
[52] U.S. Cl. ........................................... 299/12; 55/1; 55/276; 55/326; 55/327; 55/337; 55/343; 55/344; 55/348; 55/385 D; 55/415; 55/418; 55/429; 55/431; 55/472; 98/50
[58] Field of Search ............................ 55/1, 325–327, 55/337, 343, 344, 347, 348, 385 D, 415, 418, 429, 431, 472, 465, 320, 276, DIG. 21; 299/12; 98/50; 181/231, 238, 252, 257

[56] References Cited

U.S. PATENT DOCUMENTS

| | | | |
|---|---|---|---|
| 1,825,274 | 9/1931 | Leach | 55/1 |
| 1,970,077 | 8/1934 | Collins | 55/343 |
| 1,983,304 | 12/1934 | Olson | 55/276 |
| 2,323,707 | 7/1943 | Danz | 55/347 |
| 2,451,755 | 10/1948 | Lee | 55/343 |
| 2,552,847 | 5/1951 | Farr et al. | 55/276 |
| 2,607,437 | 8/1952 | Crawford et al. | 55/418 |
| 2,622,696 | 12/1952 | Pegg et al. | 55/429 |
| 2,790,508 | 4/1957 | Allander et al. | 55/415 |
| 3,387,889 | 6/1968 | Ziemba et al. | 55/385 D |
| 3,409,131 | 11/1968 | Petersen et al. | 55/418 |
| 3,653,190 | 4/1972 | Lee et al. | 55/337 |
| 3,792,568 | 2/1974 | Gundlach et al. | 55/385 D |
| 4,008,059 | 2/1977 | Monson et al. | 55/431 |
| 4,025,320 | 5/1977 | Amoroso | 55/1 |
| 4,110,876 | 9/1978 | Weiss et al. | 55/276 |
| 4,158,449 | 6/1979 | Sun et al. | 55/337 |

FOREIGN PATENT DOCUMENTS

| | | | |
|---|---|---|---|
| 124613 | 5/1931 | Austria | 55/327 |
| 2538914 | 3/1977 | Fed. Rep. of Germany | 55/1 |
| 2635405 | 2/1978 | Fed. Rep. of Germany | 299/12 |

Primary Examiner—David L. Lacey
Attorney, Agent, or Firm—Emrich, Lee, Brown & Hill

[57] ABSTRACT

Dust generated in coal mining is removed by means of a blower having an exhaust fan which draws air through its intake opening from the face of the coal. The blower is provided with a first stage of closely-arranged small-diametered cylindrical-shaped individual centrifuges between its intake opening and the exhaust fan in which the dust-laden air spins as air is drawn therethrough and concentrates the dust in an annular surrounding portion which is separately drawn from the centrifuges through a conduit also evacuated by the exhaust fan. This conduit contains a sharply-reversing bend which effectively separates and discharges the dust into a collection chamber, e.g. a removable bin. A grid disposed ahead of the first stage of individual centrifuges prevents large size particles from entering the centrifuges; and a second stage of closely-arranged, similarly-operating individual centrifuges located in the conduit closer to the exhaust fan remove "fines" which were not discharged to the collection chamber. The thus cleaned air exiting from the conduit is combined by the fan with the dust-freed air drawn from the core of the individual centrifuges and is discharged to the mine return area.

26 Claims, 23 Drawing Figures

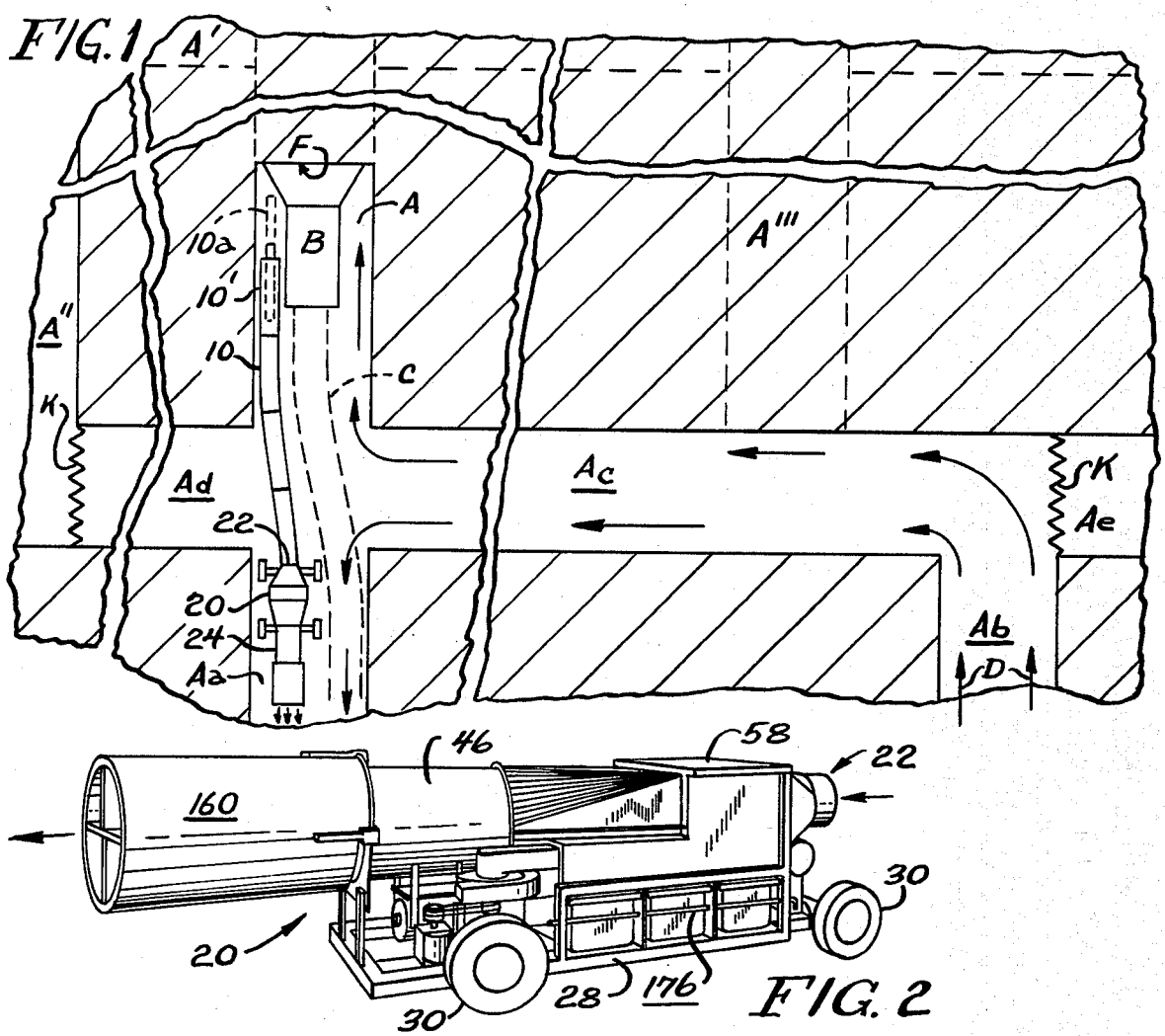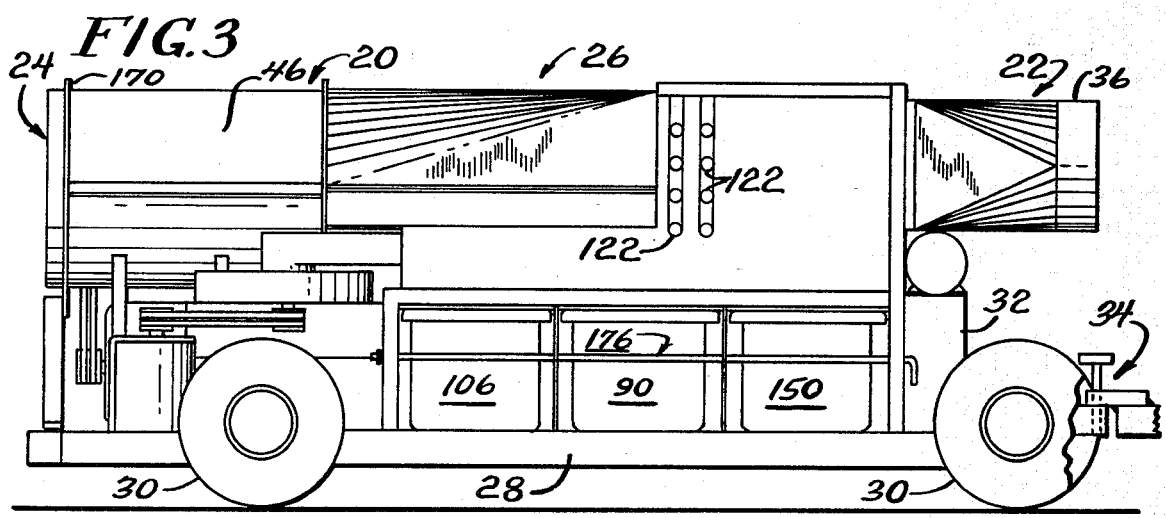

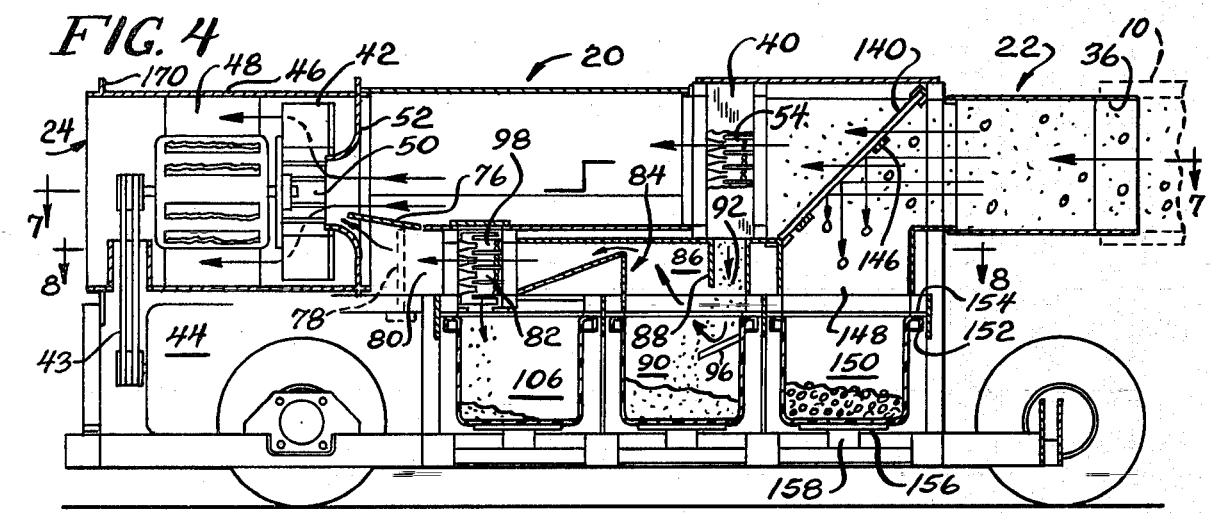
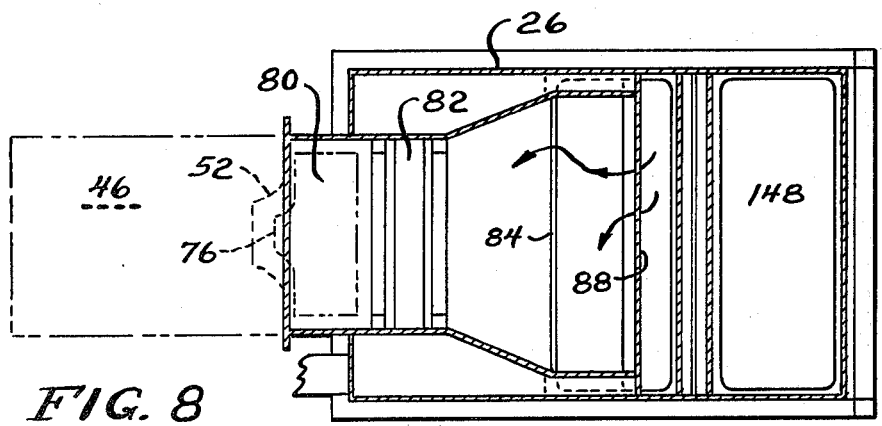

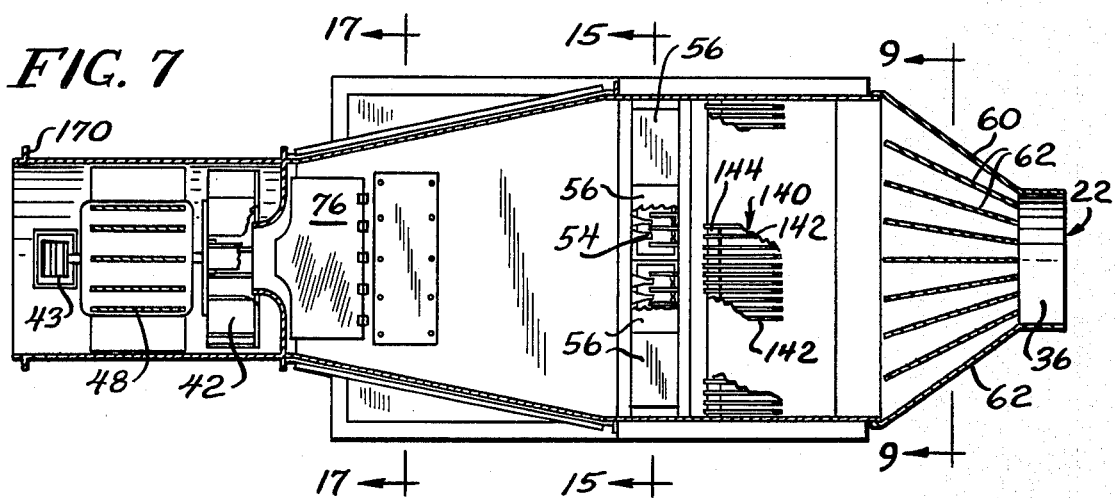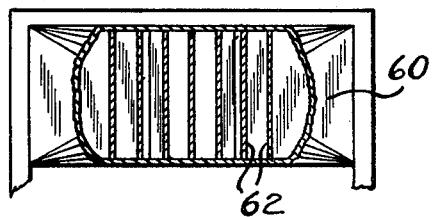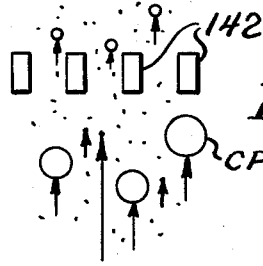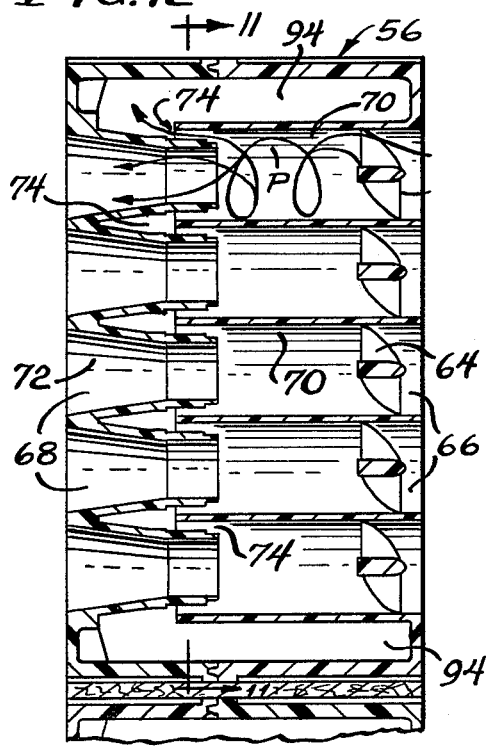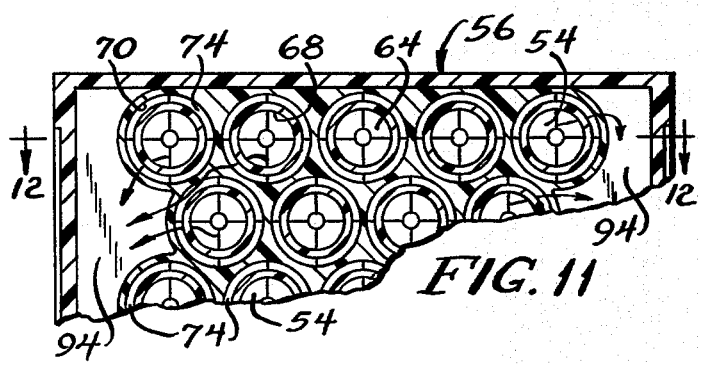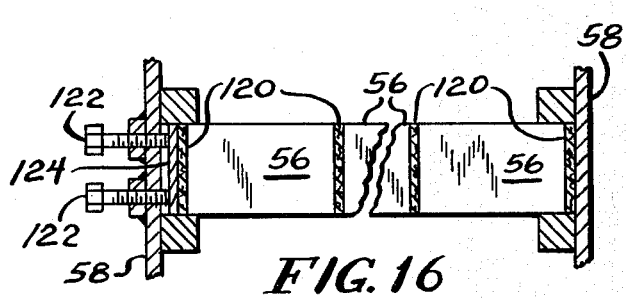

BLOWER AND DUST COLLECTING MACHINE AND METHOD OF OPERATION

This invention relates to coal mine air cleaning apparatus and method.

More particularly, a principal object of the invention is to provide apparatus and method in which large volumes of air are quickly moved across the face of the coal as it is being mined in order to dilute, disperse and move methane and other noxious gases out of the area in which the miners are working while maintaining a low dust level therein for the safety and health of the miners working at the coal face.

In deep coal mining, the importance of being able to force large amounts of air into the area where the miners work has long been recognized. First of all, fresh air is required to supply oxygen for the miners to breathe. Secondly, it has been utilized to reduce the potential danger presented by the possibility of release and/or escape of methane or other gases into the mining area as the coal face is cut away. Commonly, a brattice or other partition of planks or cloth has been set up from adjacent the fresh air source and used to lead the flow of fresh air through the previously-mined areas into the working area where the fresh air is required. In the past, this has been enhanced by means of a blower which is set up in the return area with its intake in communication with the face of the coal being mined so as to pull air therefrom and exhaust it into the previously-mined or return area therebehind. Such a blower must be capable of pulling air from the coal face at a rate which is considerably greater than the inflow of the gas to dilute the same and there must be an adequate supply of fresh air.

The problem, however is complicated by the increasingly large amounts of dust that have been generated in the mining act since the changeover from earlier hand-picking of the coal to the use of coal-cutting machines, some of which machines are capable of mining 100 tons or more of coal per hour depending upon the conditions of the area in which the coal is being mined. In order to handle the large amounts of coal dust which are generated in operation of the machine and represent potential explosion and health hazards to the miner, it has been customary to position the blower with its exhaust away from the coal face and establish its communication with the coal face through ventilating tube sections which may be oval or circular in cross section and have a diameter in the order of 10 to 20 inches. These tube sections are individually added at every few feet of coal mined until all sections are in use. The blower is then moved up the distance represented by the assembled ventilating tube sections and the process resumed.

Obtaining the amount of air and the required flow rate thereof across the coal face has not been a problem. The problem, however, has been that the entering fresh air as it passes across the coal face is quickly polluted with the coal dust and the blower does not eliminate, but only relocates the highly-explosive dust in the discharge area of the blower in the mine return close behind the workers where it remains a potential hazard to the safety and health of the mine workers.

One approach in dealing with the problem has been to add "rock dust" to the exhaust of the blower on the expectation that the rock dust, being heavier than the dust content of the air being exhausted by the blower, will help bring down the coal dust or "float dust" as it is sometimes called. Again, this has not solved the problem; and in fact, the added rock dust itself is considered a potential hazard to the miners' lungs and to the machinery operated in the mine.

Of consequence, government rules and regulations presently in effect require close monitoring of the dust discharge from the blower and require that each time it reaches a provided level, the return of the mine be closed and the entire area including the ribs, top and floor of the mine section be rock-dusted as with a Bannan rock-dusting machine until no coal dust is visible. Often this requires rock dusting as much as 1500 to 2000 feet of coal-dusted tunnel area behind and about the mining area. A shutdown of the mining operation for this purpose can last as long as 24 to 36 hours and is obviously expensive in terms of lost coal production, as well as the expense of the rock dust and the labor required to lay down the rock dust. For example, if the coal machine is harvesting coal at the rate of 100 tons of coal per hour, this means a loss of 2400 or more tons of coal for each breakdown. Also, government rules and regulations set fines to which the coal companies are subjected when the monitored maximum of "float dust" discharged into the mine is exceeded. There is also the problem of "black lung" to which the miners have long been subjected as a consequent of said "float dust" present in the mining area where they work.

Various attempts have been made in the past to filter the coal dust. U.S. Pat. No. 1,585,358 discloses the use of a railroad car provided with intake and exhaust fans which pull air into and out of the car, the air in process engaging a deflector which is sprayed with water to precipitate the dust. U.S. Pat. No. 1,982,470 shows similar apparatus provided with a cowl which captures the dust-laden air which is then passed through electrostatic precipitator tubes are discharged. U.S. Pat. No. 2,375,689 shows a coal pulverizing machine which discharges via a suction fan into a trailing car having a screened exit through which the discharged air is returned to the coal face. U.S. Pat. No. 2,065,970 describes an air purifier comprising an exhaust fan in a housing having a filter in both its intake and exhaust openings and is described as useful underground in mining operations. However, sofar as the inventors are aware, none of said apparatus have been used successfully in coal mines as witness the government's present day rock-dusting requirements. More recently, attempts have been made at collecting dust in the mines by utilizing blowers of the so-called scrubbing type in which the dust-laden air is sprayed with water in an attempt to coagulate the finer dust particles into larger particles which can be more readily handled. Among the deficiencies of such apparatus, however, are the need for a large supply of water and the problems in handling the water as well as the additional power requirements of the apparatus.

In accordance with this invention, a blower having a capacity to quickly pull large amounts of air across the face of the coal at a rate sufficient to dilute, disperse and remove the escaping methane and other gases is provided with means which divide the dust-laden column of air pulled off the coal face into a large number of smaller-diametered columns. These are individually simultaneously spun so as to radially separate and collect the dust content thereof as the columns freed of their dust content are discharged through the blower exhaust.

In the disclosed embodiment of the invention, said means comprise a large number of miniature-sized centrifugal separators or centrifuges which are arranged closely and compactly in side-by-side parallel relation and define a first dust separating stage between the blower intake and exhaust through which the dust-laden air pulled off the coal face moves in response to the pull of the exhaust fan.

A feature of the invention is that as the blower exhaust fan pulls the dust-freed central core of air through the outlet of the individual centrifuges, the exhaust fan also pulls a small portion of air from the sides of the individual centrifuges where the dust is concentrated and leads it quickly through an air-tight conduit or passageway which includes a removable bin or collection area into which the dust content of said small portion is discharged in response to a sharp change in direction of flow of the thus concentrated dust-laden air portion.

A feature of the invention is that the air pulled through the centrifuges is substantially along a straight line, and that the small portion of air that is pulled laterally off the sides of the centrifuges is substantially recombined with the air drawn through the outlets of the conduits so that slowdown of the air flow through the blower is minimal.

Preferably, a second dust separating stage made up of similar miniature-sized centrifuges but in smaller number, is provided in the conduit closer to the exhaust fan so that dust particles or "fines" not captured in the first collection area are similarly spun off to the side of these second stage centrifuges and the thus freed air delivered through the conduit into the exhaust fan. This time, however, a second stage evacuating fan or pump is utilized to remove a similarly small portion of air from adjacent the sides of the centrifuges through a second tortuous conduit which releases the "fines" to a collecting bin and discharges the freed air to the mine area.

It has been found in practice that about 10% of the air entering the centrifuge inlets is required to move the dust-laden portion out of the centrifuges so that the blower fan discharges about 99% of the dust-cleaned air back into the mine area (90% through the outlet of the first stage and 9% through the outlet of the second stage centrifuges).

Where there is an excessive generation of "fines" pulled off the coal face by the blower, a third stage of centrifuges may be located over the discharge of the second stage evacuating pump to complete the separation of "fines." In this stage, the exhaust of the second stage pump is relied upon both to spin the air through the centrifuges and to enforce separate discharge of the radially diverted air portion in which the "fines" are concentrated. Optionally, these may be collected or permitted to discharge onto the mine surface beneath the blower.

Thus, a feature of the invention is that the air pulled off the coal face by the blower can be effectively cleaned of its dust content and with minimal depreciation of air flow required to dilute, disperse and remove the methane gas.

A further feature of the invention is that the dust-laden air as it enters through the blower intake from the coal face is diverted laterally so that the entering column of dust-laden air can embrace, and be distributed uniformly through, a larger number of closely-packed centrifuges than would be possible if the first separating stage were restricted to an air column having the cross section of the blower intake. Thus, the effectiveness of the first dust separating stage can be maximized while accommodating the dimension of the blower and particularly its height to the mining area in which it is utilized.

Another feature of the invention is the provision of a grid between the blower intake and its first dust-separating stage which prevents passage of oversize coal particles into the centrifuges. In its presently preferred form, such a grid comprises spaced vertical louvers or fins which are inclined downwardly and away from the blower intake and extend across the full width of the first separating stage of the centrifuges and discharge the unpassed particles into a collecting bin therebelow.

A further important feature of the invention are the collection bins located in the discharge system of the blower to receive the coal particles resisted by the grid as well as the dust and "fines" which are drawn off the inner sides of the centrifuges comprising the first and second stages. These bins are sealed air-tight to the discharge of said grid and also to the discharge of both the first and second dust separating stages such that only air freed of coal particles, dust and "fines" pass through the exhaust of the blower wherefore maximizing the efficiency of its dust-freeing funtion and eliminating the need for rock-dusting the exhaust discharge.

Still a further feature of the invention is the means provided to facilitate recombining of the dust-freed air flow from the first and second centrifuge stages in a manner which avoids air turbulence in the flow of the intake air through the blower.

Still another feature of the invention is the use of an adjustable proportioning valve or damper to regulate the proportion of air which is pulled by the exhaust fan to collect the dust concentrated at the sides of the centrifuges wherefore the exhaust fan can be adapted to pull a maximum of dust-freed air for discharge into the mine area.

Another feature of the invention is the provision of a silencer which is removably mounted over the exhaust of the blower to effectively lower the noise level of the blower to within acceptable limits while permitting a maximum rate and volume of air flow through the apparatus.

A companion feature thereto is that the silencer, although large and bulky, can be readily slipped into place or removed from the exhaust end of the blower within a matter of seconds.

Still other features of the invention include:

(a) that the exhaust fan handles only dust-freed air;

(b) that the removal of dust can be accomplished "dry" without the problems of water on which most competitive systems rely;

(c) that large volumes of fresh air in the order of 6,000 to 11,000 cfm can be moved across the coal face and continuously divested of the dust generated in said mining act so as to maintain the health and safety of the miners without having to shut down at intervals for rock dusting; and (d) that these and other objects and features of the invention can be realized in apparatus that can be accommodated in the mine and operated at maximum efficiency and with low maintenance requirements.

Further objects, advantages and features of the invention will be at once apparent or will become so upon consideration of the preferred embodiments of the invention which now will be described in connection with the accompanying figures comprising the drawing.

Referring, therefore, to the drawing;

FIG. 1 diagrammatically illustrates a section of a coal mine in which a blower system in accordance with the invention is utilized to maintain a continuous flow of fresh air across the coal face being mined, to separate out the dust with which said air becomes contaminated and collect said dust so that only air freed of said dust discharges into the mine return.

FIG. 2 illustrates a preferred embodiment of a blower in accordance with the invention, the blower being illustrated with a silencer removably mounted over the exhaust thereof;

FIG. 3 illustrates in side elevation the same blower but with its silencer omitted and includes a tow hitch on its intake end;

FIG. 4 is a longitudinal sectional view taken vertically through the blower and illustrates its components for separating the dust from the air entering through its intake;

FIG. 5 illustrates the exhaust end of the blower;

FIG. 6 illustrates the intake end of the blower;

FIG. 7 is a horizontal sectional view taken through the blower along lines 7—7 of FIG. 4 and illustrates details of the arrangement and construction of the components for controlling the airflow through the apparatus;

FIG. 8 is a horizontal sectional view taken through the blower along lines 8—8 of FIG. 4 and illustrates further details of the components through which the air flows between the intake of the blower and its exhaust.

FIG. 9 is a vertical sectional view taken along lines 9—9 of FIG. 7;

FIG. 10 illustrates schematically the function and utility of the grid which is located between the air intake and first dust-separating stage of centrifuges;

FIG. 11 is a vertical sectional view taken through the first stage of centrifuges, the view being considered taken axially of the centrifuges as along lines 11—11 of FIG. 12 and looking in the direction indicated by the arrows;

FIG. 12 is a view taken at right angles to the showing of FIG. 11 along lines 12—12 therein;

FIG. 16 illustrates one manner of mounting the first stage of centrifuges to prevent passage of dust other than through the intake of the centrifuges;

Figure 15:
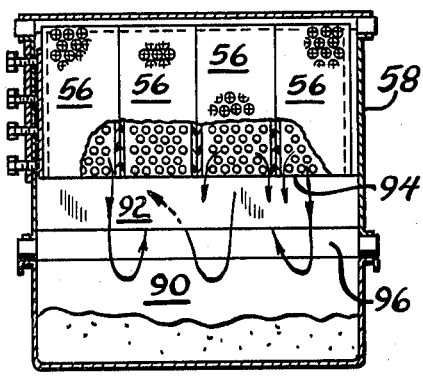
FIG. 15 is a sectional view taken along lines 15—15 of FIG. 7 and illustrates the path of the dust-laden air as it is withdrawn from the side of the first stage centrifuges and discharges into the collection bin.

Referring now more specifically to the several views which comprise the drawings and wherein like parts are identified by like reference numerals and/or letters, FIG. 1 illustrates a section of a coal mine where a mining operation is being conducted. In said view, A represents a tunnel in which a coal-cutting machine represented at B is cutting coal across face F. As the coal is mined, it is loaded onto a conveyor represented at C which transports the mined coal through a return tunnel Aa to a delivery area not shown. Commonly, under modern-day coal-mining practices, the coal is cut out of the face F in 100 foot long tunnel sections each spaced 100 feet apart whereas the tunnel width may be in the order of 14 feet. Thus, in FIG. 1, when tunnel section A has been cut 100 feet into the coal face F from the tunnel section Aa, the cutting machine B will be turned to the left at right angles and positioned to cut a second 100 foot long tunnel represented at A' or until it breaks through to tunnel A". This will leave undisturbed an area of unmined coal as a support for the mine roof defined by narrower tunnel sections A, A', A" and Ab which is 100 feet square. The coal-cutting machine B then will be moved back to tunnel section Ac and repositioned about 100 feet to the right of tunnel A to initiate cutting tunnel A'".

In order to disperse and dilute methane gas escaping through the coal face F during the mining action, large volumes of fresh air are continuously forced into the mining area via tunnel sections Ab and Ac using a remotely-located high capacity blower, or system of blowers, not shown. Partitions of brattice cloth represented at K are used to close off tunnel Ad and tunnel Ae which lead to previously-mined areas wherefor the flow of the entering fresh air as represented by arrows D can be concentrated in the active mining area where it is required.

As illustrated in FIG. 1, blower 20 is located in the return tunnel Aa to effectively regulate the volume and direct the flow of the fresh air across the face of the coal as it is mined. For the purpose, its exhaust end 24 is directed to discharge into the return Aa and its intake 22 to communicate with the coal face at the side of the machine B opposite that along which the fresh air enters. As illustrated by arrows D, the flow of fresh air across the coal face F thus is a function of the blower 20 and by adjusting the effective pull of blower 20, said flow can be increased or decreased, the portion of fresh air not demanded by the blower splitting off and exiting into the return tunnel Aa. In order to maximize the effectiveness of the blower 20, its intake 22 communicates with the coal face F via an adjustable length ventilating duct identified at 10. Such a duct may comprise, for example, perhaps 20 tubular sections, each 10 feet long and 16 inches in diameter which are separately assembled one at a time so that the blower remains in close communication with the coal face without having to be continuously moved. It will be appreciated that the tubular sections may be of greater or lesser length and/or of greater or lesser diameter. They may be made of a wide variety of materials, such as metals or plastics including fibre glass which is presently preferred. They also may have a cross section other than circular. For example, they may be rectangular or oval in cross-section. Advantageously, a smaller diametered tubular section 10a may be telescoped within the last full size tube section 10' and withdrawn therefrom in small increments to more closely retain communication with the coal face as it is cut away by machine B. Once the last tube section has been assembled in place on the end of the duct and/or the machine cuts through the 100 foot tunnel section on which it is working, the duct is disassembled, to permit either the blower 20 and/or the coal-cutting machine to be relocated for cutting the next tunnel or series of tunnels as, for example, illustrated at A'''. It will be understood that under some circumstances, one or more of the dust sections 10' will have an arcuate shape. For example, if the blower 20 is not moved from its position illustrated in FIG. 1, then the ventilating duct 10 will require two elbow sections in order for it to follow the coal-mining machine B close to the near wall as it cuts out tunnel A'''.

It thus will be understood that during the operation of the coal-mining machine B, blower 20 is adapted to continuously draw a 16 inch diametered column of air through the ventilating duct 10 from the coal face F and at a flow rate which suffices to dilute, disperse and contain noxious gas such as methane, as it escapes from the coal face during the cutting action and to discharge the same into the return behind the blower and so to be directed away from where the miners are working (at B).

It will be appreciated that, in the process, the blower also picks up the dust generated by the coal-mining machine B as it cuts the coal face F, which would otherwise pollute the working area and represent a safety and health hazard to the miners. An important feature of the invention is that as the blower 20 draws air across the coal face F in volumes sufficient to dilute the methane, it simultaneously separates out the dust contained by the air entering its intake 22 and collects the dust so that it is not discharged through its exhaust end 24 to contaminate the return area Aa.

As illustrated by FIGS. 2 through 6, a combined blower and air cleaner represented at 20 in accordance with this invention comprises an enclosed housing generally indicated at 26 in FIGS. 2 and 3 which is mounted on a frame 28. Frame 28 in turn is supported on rubber-tired wheels 30 which provide the blower 20 with its required motility. Blower 20 may be self-propelled to move in forward and reverse as by operation of provided hydraulic drive means 32 at an adjustable speed not exceeding two miles per hour. Alternatively, as illustrated in FIG. 3, the blower may be provided with a tow hitch 34 for convenience in pulling or otherwise locating the blower in place behind the coal face F.

As shown best in FIGS. 4 and 6, the intake 22 of the blower comprises a rim portion 36 which is cylindrical in shape and diametered so as to snugly but removably receive the first 16" diametered-conduit section of the ventilating duct 10 which is assembled thereover. Aligned therebetween and the exhaust end 24 of the blower is a first dust-separating stage identified generally at 40 in FIG. 4. Said first stage comprises a large number of closely-packed, miniature-sized, small-diametered and generally cylindrically-shaped centrifuges which are arranged in side-by-side parallel relation with their inlet 66 facing the blower intake 22 and their outlet 68 facing the exhaust end 24 of the blower. The exhaust end 24 of the blower comprises a generally cylindrical housing 46 which contains a mount 48 on which is rotatably mounted a pump or fan 42.

In FIGS. 4 and 5, the fan 42 is illustrated as of the squirrel-cage type. However, any other suitable construction of fan capable of developing the required air flow through the blower housing 26 may be utilized. The central area of the fan is shown closed as by a baffle 50 and a centrally-orificed member 52 provides communication of the rotating fan with the first dust-separating stage 40 along the axis on which the fan rotates so that the pull of the fan is substantially along a straight line through the individual centrifuges 54 comprising the first dust-separating stage 40. As illustrated best in FIG. 5, the main exhaust fan 42 of the blower is rotatably driven by motor 44 as through a belt pulley arrangement indicated generally at 43. It will be understood that the ratio of the pulley diameters and the rpm at which the fan is driven will be such that the evacuating fan is capable of drawing air from the intake end of the blower at 22 through the centrifuges 54 of the first dust-separating stage 40 at a flow rate that is effective to draw large volumes of air across the coal face to clear said coal face of the dust as it is there generated while diluting and removing any noxious gases which are escaping through the coal face. In practice, it has been found that a capacity of 8,000 to 11,000 cfm will suffice for the purpose. As needed, this capacity may be adjusted by changing the ratio of the pulley diameters.

A feature of the invention is the ability of the centrifuges 54 comprising the first dust-separating stage 40 and its associated structure to separate out the contaminating dust content of the air drawn through the blower intake so that essentially only dust-freed air is discharged or exhausted from the blower, and to be able to do so without substantially altering the effectiveness of its pull on the blower intake. Said means now will be described.

Considering FIG. 15 with FIG. 7, it will be seen that in one form of the invention, the first dust-separating stage 40 comprises four generally-rectangular-shaped panels or units 56 which may be molded of plastic such as polypropylene. Each said panels 56 is illustrated as comprising fourteen parallel horizontal rows of the aforementioned centrifuges 54 which are alternately staggered such that every other row contains five centrifuges; and the intermediate rows contain four centrifuges. Each said panels measures approximately 18-½ inches by 9-½ inches and have a depth of about 5-½ inches which represents the longitudinal or axial dimension of the centrifuges 54, The diameter of the individual centrifuges approximates 1-¼ inches. As illustrated by FIGS. 7 and 15, the four panels are located in the exhaust side of a rectangular plenum 58 with which the intake of the blower communicates through its flared housing 60 and are arranged with their longest dimension vertically disposed so that the first stage measures approximately 18-½ inches high by 38 inches wide, and therefore is several times wider than the diameter of the 16 inch blower intake. Said four panels, of course, could be replaced by a single large panel and they could be formed of material other than plastic, for example, metal. The centrifuges could also be formed individually and appropriately arranged in provided receiving structure. As illustrated by FIGS. 6, 7 and 9, means in the form of vertically-disposed flow diverter plates 62 equidistantly divide the intake 22 of the blower and diverge outwardly therefrom to the adjacent open end of the plenum 58 so that the column of dust-laden air drawn through the 16 inch diametered-intake 22 from ventilating duct 10 is uniformly distributed across the full width and height of the first stage dust separators and its centrifuges 54. As shown best in FIG. 16, the individual panels 56 are separated by thicknesses of suitable gasket material 120, and exteriorly accessible screws 122 engage a plate 124 so that, on tightening, the four panels 56 may be sealed air-tight and so that the dust-laden air from the intake does not bypass the centrifuges 54.

Figure 13:
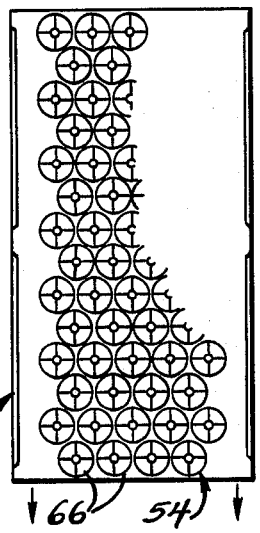
FIG. 13 illustrates the entrant end of the first stage of centrifuges.
Figure 14:
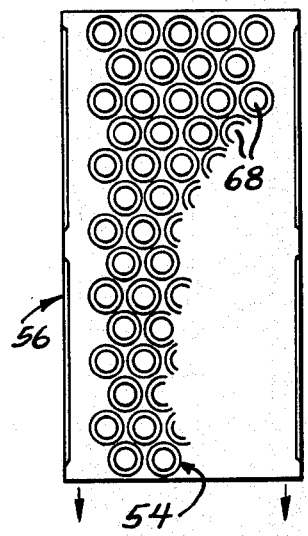
FIG. 14 illustrates the discharge end of said centrifuges.

As illustrated best by FIGS. 11 and 12, each said centrifuges 54 is generally cylindrical in shape, has an inlet 66 (FIG. 13) facing the blower intake, an outlet end 68 (FIG. 14) facing the exhaust fan 42 of the blower and stationary vanes 64 inwardly of their inlet end 66 which are suitably pitched in order to effectively spin the entering dust-laden air in response to the suction pull of the exhaust fan 42 on the outlet 68 of the centrifuges. The dust content of the entering air is thereby moved radially out of the central core of the centrifuges and concentrated adjacent the sides of the centrifuges as illustrated at 70. FIG. 12 illustrates that the outlet end 68 of each said centrifuges also includes an outwardly flared tubular portion 72 of reduced diameter which surrounds outlet 68 of each centrifuge and provides an annular entrance 74 about said outlet 68 at the sides of the centrifuges through which air portion P adjacent the walls of the centrifuges in which the dust concentrate can be continuously evacuated from the centrifuges 54. Thus, the exhaust fan 42 draws only dust-freed air through the outlet 68 of the centrifuges and therethrough into the return area Aa behind the blower.

In accordance with the invention adjustable means are provided at 76 (FIG. 4) by which the exhaust fan 42 is utilized to simultaneously withdraw said small portion P of air from immediately adjacent the inner surface or side of the centrifuges in which the dust content of the entering air is concentrated by vanes 64. Thus, also considering FIGS. 8 and 15 with FIG. 4, it will be seen that the evacuating fan 42 communicates with each of the centrifuges 54 separately of their outlets 68 via an opening created by the angular set of damper 76 which leads into a tortuous conduit comprising a first conduit portion 80 which contains a second stage 82 of dust-separating centrifuges, slot 84, a further conduit portion 86 which communicates beneath baffle wall 88 with the top of collection bin 90 and outlet 92 to the channel portion 94 (FIG. 11), with which said annular exits 74 of the individual centrifuges communicate. Thus, under the pull of the evacuating fan 42 as air-freed of dust is drawn through the outlets of the first stage centrifuges 54, simultaneously, a dust-laden air portion is also continuously removed from each centrifuge 54 and directed first downwardly into the collecting bin 90 (FIG. 3) so as to impinge on its deflector plate 96, then quickly reversing in direction (discharging its dust content into bin 90) and moving upwardly through conduit portion 86, then through slot 84 into conduit portion 80, through the second stage centrifuge 82 and beneath damper 76 into the exhaust of the fan 42.

As shown in FIG. 4, the proportioning valve or damper 76 comprises a hingedly-mounted plate which protrudes into the center of orifice member 50 and is adjustable by tightening or loosening member 78 in its threaded connection to the under structure of the blower housing to change the proportion of air diverted from the first stage centrifuges 54 to remove the air portion P of the centrifuge in which the dust is concentrated. In practice, it has been found that good results are obtained when the apportioning valve 76 is adjusted to divert about 10% of the air entering the centrifuges from the blower intake. This means that the exhaust fan is drawing about 90% of the dust-freed air directly through the outlets 68 of the centrifuges and discharging it into the mine area behind the blower. However, it is a feature of this invention that the diverted 10% of air after being discharged of its dust content into the collection bin 90 is refiltered through the centrifuges of a second stage dust separator 100 and reunited with the 90% of air so that substantially all the air entering the intake is discharged by fan 42 through the blower exhaust 24 and returned thereby to the mine area after being cleaned of dust.

Figure 17:
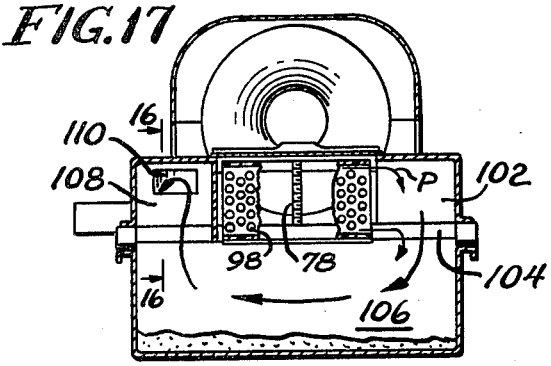
FIG. 17 is a sectional view taken along lines 17—17 of FIG. 7 looking in the direction indicated by the arrows and shows details of the second stage of dust-separating centrifuges and the path along which the withdrawn dust concentrated air portion discharges into a second collection bin.
Figure 18:
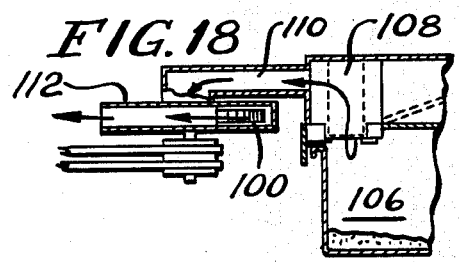
FIG. 18 is a view taken along lines 18—18 of FIG. 17 looking in the direction of the indicated arrows and shows the path the air takes as it is drawn from the sides of the second stage centrifuges for collection of its dust content.

It will be understood that the centrifuges 98 of the second dust-separating stage 82 located in conduit portion 80 (FIGS. 7 and 8) are similarly constructed and arranged as are the centrifuges of the first stage 40. In fact, said second stage preferably comprises a single panel or bank of centrifuges corresponding to any one of the four panels 56 which comprise the first stage dust separator but laid on its side with its longer dimension disposed horizontally. Thus as illustrated in FIG. 4, air drawn through slot 84 after being discharged of its dust content into bin 90 is pulled through the inlets of the second stage centrifuges 98, its vanes spinning the air so that coal "fines" which escaped bin 90 are concentrated at the side of the centrifuges 98 as the thus twice cleaned air is pulled from the center of the second stage centrifuges into the rotating exhaust fan 42 where it combines with the discharging air from the outlets of the first stage centrifuges. At 100 (FIG. 18) is a second evacuating pump or fan which effectively communicates with the annular air portion of the second stage centrifuges in which the dust is radially concentrated. Said second stage pump 100 is suitably designed to also withdraw a portion of air equal to about 10% of the air entering the inlet of the second stage centrifuges. Thus, as illustrated by FIGS. 17 and 18, the second stage pump 100 effectively draws air portion P from the centrifuges in which the "fines" are concentrated, this part being drawn out of the centrifuges 98 through the provided channels in the second stage panel 82 along one side thereof into conduit space 102, downwardly through opening 104 into a second dust-collecting bin 106, moving across the top thereof and exiting therefrom upwardly through a second conduit portion 108 on the opposite side of the second stage 82 of centrifuges, its dust content being separated by said sharp changes in direction of air flow and collecting in bin 106. The air portion thus discharged of its dust enters conduit portion 110 and is discharged by exhaust pump 100 into the mining area behind the blower.

Figure 19:
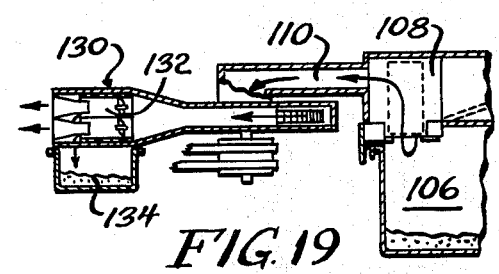
FIG. 19 is a view generally similar to FIG. 18 and illustrates the assembly of a third stage of dust-separating centrifuges located in the discharge of the second stage centrifuges scavenging pump or fan.

However, as illustrated at 130 in FIG. 19 a further dust collecting member represented by, a third stage of dust-separating centrifuges may be located in the discharge 112 of the second stage evacuating pump 100, should the situation require, for example, if an excessively large amount of "fines" remain in the discharge of the second stage pump 108 to atmosphere. Referring to said FIG. 19, said third stage represented by 130 is shown as comprising a smaller number of centrifuges 132. For example, it may comprise two rows, each containing four centrifuges. The centrifuges of the third stage are constructed as described above in connection with the first and second stage of centrifuges and are illustrated in detail by FIGS. 11 and 13. The inlet end of said first stage centrifuges thus communicate with the discharge of the second stage evacuating pump 100 which effectively forces the discharging air through the centrifuges as it spins the same to concentrate any dust or "fines" present to adjacent the sides of the individual centrifuges 132. The thus further treated air can be discharged through the outlets of the centrifuges directly into the atmosphere behind the blower under the force of the second stage evacuating pump 100 which simultaneously forces the outer air portion containing the fines and/or dust to the mine floor below the blower. Preferably, however, a third stage dust-collecting bin 134 will be located to receive the "fines." Conceivably, the number of dust-separating stages of centrifuges could be multiplied even more. However, in tests to date, two stages of centrifuges seems to be sufficient to reduce the dust content of the discharging air to within tolerable limits.

Referring again to FIG. 4, a further feature of the invention is the location of a grid 140 ahead of the first stage 40 of dust-separating centrifuges 54 to prevent passage of large particles into its centrifuges 54 which might harm or at least clog and thereby interfere with the proper functioning of said centrifuges 54 of the first stage. Such a grid 140 as illustrated best in FIG. 7, comprises a plurality of vertically extending fins or louvers 142 comprising metal strap pieces roughly ⅛" by 1" and separated by spacers 144 comprising shorter length metal straps each approximately ¼" in thickness. FIG. 4 illustrates said grid 140 supported on transverse rods 146 so that it extends downwardly and away from the intake across the width and breadth of the first stage, being inclined at about 45° to the first stage of dust-separating centrifuges 54. The oversize particles cp as indicated in FIG. 10 drop through a discharge opening 148 into collecting bin 150 located therebeneath. It will be further appreciated that each of the bins 90, 106, and 134 into which the "fines" dust and larger coal particles collect are advantageously connected air-tight into the exhaust system of the blower as it is enforced by the exhaust fan 42. Thus, it is a feature of the invention that each said bin has a horizontally outwardly turned lip portion 152 which engages a suitably-located gasket 154 disposed about the respective openings to said bins. Each said bin is individually supported on a plate 156 which in turn is supported by mechanical or hydraulic-operated elevators 158, preferably one at each end of the plate 156. Said elevators, when energized, effectively raise said bins and thereby their lip portion 152 against the gasket 154 to seal the respective bins air-tight into the exhaust system of the blower. Removably mounted barrier rods 176 serve to retain the bins in place on frame 28. When the bins fill with the collected dust, fines and large coal pieces, these barrier rods 176 are removed and the elevators actuated in reverse to lower the bins and permit their removal. Preferably, the open tops of the bins are closed by an appropriate lid (not shown) for convenience in removing the collected coal particles and dust to outside the mine, thus further minimizing the dust hazard within the mine section and/or otherwise disposed of. For example, the collected dust product may be sold for use in satisfying specific energy requirements.

Figure 20:
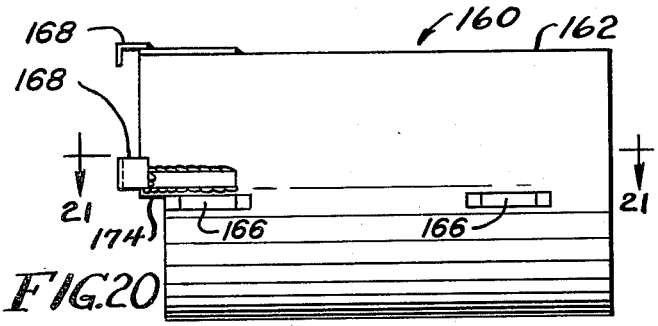
FIG. 20 is a side elevational view of a silencer which is adapted to be removably mounted over the exhaust end of a blower as illustrated in FIG. 2.
Figure 21:
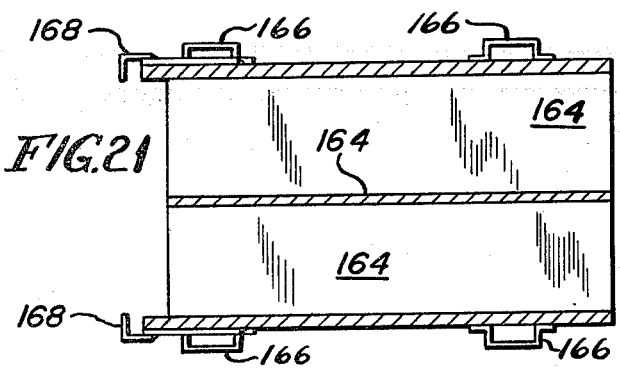
FIG. 21 is a longitudinal sectional view taken through the silencer along lines 21-22 in FIG. 20 looking in the direction indicated by the arrows.
Figure 22:
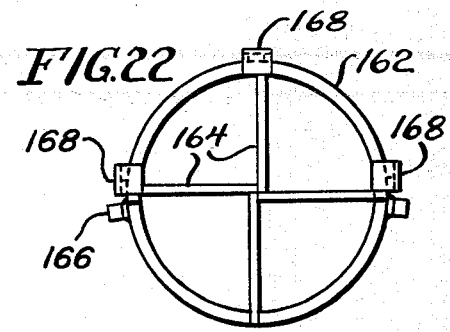
FIG. 22 is an end view of the silencer.
Figure 23:
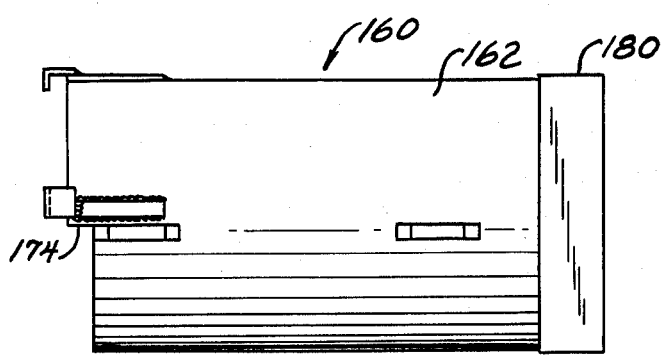
FIG. 23 is a view generally similar to FIG. 20 and shows a filter screen removably mounted to the exhaust end of the silencer.

FIGS. 20, 21 and 22 illustrate a silencer which may be removably located over the exhaust end of the blower in order to reduce the noise level generated by the blower under specific circumstances to a tolerable level. As illustrated by said FIGS. 20–22, such a silencer 160 comprises an open-ended cylindrical member 162 containing four right angularly-disposed rigid panels 164 which are welded to each other and to the interior side surface of the cylindrical member 162 as illustrated in FIG. 22. The interior surface of said cylinder 162 and its rigid panels 164 are coated with at least a one-inch thickness of polyurethane foam for its sound-deadening function. As shown in FIGS. 20 and 21, the silencer is provided with handles at 166 on opposed sides thereof by which it can be raised to locate its catch portions 168 over a provided upstanding flange 170 about the exhaust end of the blower. As seen best in FIG. 3, said flange 170 is spaced behind the outer terminus of the exhaust housing 46 and the under portion of the cylindrical member 162 of the silencer terminates short of the corresponding edge of the upper half of said cylinder as at 174 so that in catching on the flange, it assumes a stable portion of rest against the outer side of the exhaust housing 40. Under some circumstances, it may be useful to locate a removable filter screen 180 over the exhaust end of the silencer 160 as shown in FIG. 23.

From the above description, it will be appreciated that all of the recited objects, advantages and features therefor have been demonstrated as obtainable in a structure that is highly satisfactory for the indicated purposes.

Thus, having described the invention, we claim:
1. Apparatus for maintaining a low dust level in a coal mine about the face of the coal as it is mined comprising
(a) an enclosed blower having an intake opening, an exhaust opening and a main passageway connecting therebetween;
(b) adjustable-length ventilating duct means for establishing communication of the intake opening of the blower with the coal face;
(c) evacuating means in the exhaust opening of the blower which continuously pulls a column of air through the main passageway of the blower from its air intake opening;
(d) a first stage of closely-spaced, small-diametered, cylindrically-shaped individual centrifuges arranged in said main passageway across the cross section of the main passageway;
(e) said individual centrifuges each having an inlet toward the intake opening, an outlet end toward the exhaust opening of the blower, and means which effectively spin the dust-laden air as it enters the centrifuges such that the dust content is concentrated at the sides of the centrifuges and the central core of the centrifuges is substantially freed of the dust;
(f) air-tight conduit means establishing a second passage between the evacuating means and the inner sides of the centrifuges against which the dust is concentrated;
(g) said conduit means including a removable dust-collecting bin; and
(h) means in said second passage adapted to discharge the dust from the air in which it is concentrated into the dust-collecting bin;
(i) the second passage communicating with the first passage upstream of the evacuating means such that only the dust-freed portion of the air pulled through said passages is returned through the evacuating means into the mine.

2. Apparatus for maintaining a low dust level in a coal mine about the face of the coal as it is mined comprising (a) a mobile blower having a closed housing containing an intake opening and an exhaust opening spaced therebehind in straight line relation;

(b) an evacuating fan in the exhaust opening of the blower which pulls a continuous stream of air through the blower housing from its air intake opening and discharges the air through its exhaust opening in a direction away from the face of the coal being mined; and (c) a first stage of closely-spaced, small-diametered, cylindrically-shaped individual centrifuges which occupy the cross-section of the housing upstream of the evacuating fan;

(d) said individual centrifuges each having an inlet toward the intake opening, an outlet end toward the exhaust opening of the blower housing and means to effectively spin the dust-laden air as it enters the individual centrifuges under the pull of the evacuating fan such that the dust content of said air is concentrated at the sides of the centrifuges and dust-freed air is drawn from the central core of the centrifuges through their outlets under the pull of the exhaust fan;

(e) air tight conduit means separate from said housing having one open end in communication with the evacuating fan therebetween and the first stage, the opposite end of said conduit means communicating with the sides of the centrifuges against which the dust is concentrated whereby the evacuating fan simultaneously pulls a dust-concentrated air portion off the sides of the centrifuges into the air-tight conduit means as it pulls air through the closed housing from the outlets of the first stage of centrifuges;

(f) said air-tight conduit means including a dust-collecting area spaced between the centrifuges and the evacuating fan; and (g) means in the conduit means adapted to separate the dust content from said air as it is pulled through the conduit means and discharges it into the dust collecting area;

(h) whereby only the air thus separated of dust continues through the conduit means to the exhaust fan under the pull thereof.

3. Apparatus as claimed in claim 2 wherein the centrifuges are of molded plastic having stationary vanes which effectively spin the dust-laden air which enters the inlet of the centrifuges as it passes therethrough.

4. Apparatus as claimed in claim 2 wherein the cross-section of the blower housing occupied by the first stage of centrifuges is larger than that of the blower intake, and diverter means between the blower intake and the first stage of centrifuges uniformly direct the entering dust-laden air to the individual centrifuges comprising said first stage.

5. Apparatus as claimed in claim 2 wherein a downwardly and rearwardly inclined grid is located between the blower intake and the centrifuges of the first stage the orifices of which are sized to prevent passage of oversize coal particles into the centrifuges.

6. Apparatus as claimed in claim 5 wherein the conduit means includes an air-tight removable bin disposed below the grid to collect the particles impeded by the grid.

7. Apparatus as claimed in claim 2 wherein the dust-collection area of the conduit means comprises a removable dust-collecting bin.

8. Apparatus as claimed in claim 7 wherein the conduit means is reversely bent over the removable bin to effectively discharge its dust content into the bin.

9. Apparatus as claimed in claim 8 wherein the removable dust collection bin includes an inclined baffle against which the dust impinges as the dust-laden air reversely turns to discharge its content of dust.

10. Apparatus as claimed in claim 2 wherein means are provided which divide the pull of the evacuating fan between the outlet end of the first stage centrifuges and the conduit means which communicate with the sides of the centrifuges against which the dust concentrates.

11. Apparatus as claimed in claim 10 wherein the means which divide the pull of the evacuating fan are adjustable to vary the ratio of said pull.

12. Apparatus as claimed in claim 10 wherein an orifice member on the intake side of the evacuating fan confines the entering flow to above the axis on which the evacuating fan rotates.

13. Apparatus as claimed in claim 10 wherein the means which divide the pull of the evacuating fan comprises a deflector which effectively combines the entering air from the conduit means with the entering air from the first stage centrifuges in said area about the axis on which the fan rotates.

14. Apparatus as claimed in claim 2 wherein the conduit means contains a second stage of closely-spaced, small diametered, cylindrically-shaped individual centrifuges which occupy the cross section of the conduit means through which the evacuating fan draws air from the sides of the first stage centrifuges after discharging its dust content into the collection area of said conduit means, said second stage centrifuges including means which concentrate the dust content of said air at the sides of the centrifuges, the evacuating fan of the blower communicating with the center core of said second stage centrifuges to pull air therefrom and further evacuating means communicating with the sides of the second stage centrifuges to draw the dust concentrated air at the second stage centrifuge sides therefrom.

15. Apparatus as claimed in claim 14 wherein the further evacuating means is positioned and arranged to communicate with the sides of the second state centrifuges via a third passageway and means in said third passageway which effectively discharge its dust content into a further dust collection area as the dust-freed air is discharged by the further evacuating means into the mine behind the blower.

16. Apparatus as claimed in claim 15 having a further dust separating means through which the further evacuating means discharges into the mine behind the blower.

17. Apparatus as claimed in claim 16 wherein the further dust separating means comprises a third stage of dust-separating centrifuges.

18. Apparatus as claimed in claim 16 wherein a silencer is mounted over the outlet of the blower and through which the evacuating fan discharges.

19. Apparatus as claimed in claim 18 further including a removable filter screen mounted over the exhaust end of the silencer.

20. Apparatus as claimed in claim 2 wherein a filter screen is mounted over the exhaust opening of the blower through which the evacuating fan discharges.

21. A method of maintaining a low level of coal dust in a coal mine comprising the steps of (a) locating an evacuating fan in the discharge end of a main passageway leading from the coal face being cut so as to draw a mainstream of air from the coal face in which the coal dust particles generated by the coal-cutting action are caught;

(b) dividing said main airstream into smaller diametered columns and spinning each said columns to concentrate the coal dust particles into an annular portion about the dust-freed center core of said columns;

(c) simultaneously causing the exhaust fan to draw said dust-concentrated air from said annular portions of the mainstream and into a communicating secondary passageway which leads from said annular portions of the mainstream to upstream of the evacuating fan;

(d) discharging a portion of said coal dust particles from the stream of air being drawn through the secondary passageway;

(e) collecting said discharged coal dust particles;

(f) concentrating the dust particles remaining in said secondary stream into an indentifiable portion of said second stream; and (g) separating out and collecting said dust particles from said indentifiable portion;

(h) the thus dust-freed secondary airstream combining with the main airstream for discharge into the mine and so that only air of low dust content is discharged by the evacuating fan.

22. A method of maintaining a low dust level in a coal mine comprising the steps of (a) locating an evacuating fan in the exhaust end of a main passage which leads from adjacent the coal face where coal dust particles are created so as to draw a continuous mainstream of dust-laden air from said coal face as it is generated for discharge into the mine area in a direction away from the coal face being cut;

(b) dividing said dust-laden main airstream into a plurality of smaller-diametered columns;

(c) spinning each said smaller-diametered columns of air so as to free the dust from the center core thereof and concentrate the dust in a surrounding annular portion, and (d) while continuing to draw freed air from the core of said spinning columns simultaneously causing said evacuating fan to pull a secondary stream of air from the said surrounding portions in which the dust is concentrated;

(e) reversely bending the secondary stream to discharge its dust content;

(f) collecting said dust as it is discharged from said secondary stream; and (g) combining said secondary stream of air with the mainstream immediately ahead of the evacuating fan wherefore the evacuating fan discharges only air of low dust content.

23. A method according to claim 22 wherein the mainstream of dust-laden air drawn from the coal face is enlarged in cross-section before it is divided into said plurality of smaller-diametered columns.

24. A method according to claim 22 wherein the mainstream of dust-laden air is first separated of its larger particles before it is divided into said smaller-diametered columns.

25. A method according to claim 22 wherein the combined streams of air are filtered as they are discharged into the mine area.

26. In a process where large volumes of air are blown across the coal face being mined to dilute, disperse and remove noxious gases including methane therefrom, and the air is polluted with coal dust generated in the mining act, the improvement comprising the steps of (a) relying on the pull of an evacuating fan to draw a mainstream of air from adjacent the coal face in which the coal dust gathers as it is generated;

(b) dividing said mainstream air upstream of the evacuating fan into a plurality of smaller-diametered columns of air which are axially spun to radially move and concentrate the dust about the center core of said columns;

(c) diverting a portion of the pull of said evacuating fan so as to draw air from about the core of the smaller-diametered columns in which the dust is concentrated through a secondary passage separate from the passage mainstream of air is passed through;

(d) discharging the dust from said air drawn through the secondary passage; and (e) collecting said dust as it discharges from the air drawn through said secondary passage whereby only air of low dust content is returned to the mine.

* * * * *